3,696,026
METHOD FOR ACTIVATING A
HYDROCRACKING CATALYST
Algie J. Conner, Downers Grove, and Frank H. Adams, La Grange Park, Ill., assignors to Universal Oil Products Company, Des Plaines, Ill.
No Drawing. Continuation-in-part of application Ser. No. 799,100, Feb. 13, 1969, now Patent No. 3,586,620. This application June 1, 1970, Ser. No. 42,588
The portion of the term of the patent subsequent to June 22, 1987, has been disclaimed
Int. Cl. C10g 23/02; B01j 11/40
U.S. Cl. 208—111
10 Claims

ABSTRACT OF THE DISCLOSURE

A hydrocracking catalyst in an oxidized state is activated by a method which gives a superior performing hydrocracking catalyst. The hydrocracking catalyst is reduced and sulfided by a procedure whereby a liquid hydrocarbon stream is contacted with the hydrocracking catalyst during reduction and sulfiding. The presence of the liquid hydrocarbon stream reduces the effects of native water and water of reduction. Sulfur addition may be continued during steady-state operation.

CROSS-REFERENCE TO RELATED APPLICATIONS

This application is a continuation-in-part of our copending application Ser. No. 799,100, filed Feb. 13, 1969, now U.S. Pat. 3,586,620, all the teachings of which are incorporated herein by specific reference thereto.

BACKGROUND OF THE INVENTION

This invention relates to a method for activating a catalyst, and particularly, to a method for activating a hydrocracking catalyst (which may be either amorphous or crystalline) by a reduction and sulfiding procedure which may be performed in the presence of water without detrimental effects to the hydrocracking catalyst. More particularly, the invention relates to a method for reducing and sulfiding a hydrocracking catalyst in place, in a hydrocracking reaction zone in the presence of a liquid hydrocarbon stream, followed by an increase in catalyst temperature to promote hydrocracking reactions. This procedure allows activation, start-up and steady equilibrium operation all to take place in the hydrocracking reaction zone.

DESCRIPTION OF THE PRIOR ART

As a general rule, most hydrocracking catalysts that contain ion-exchanged or impregnated metallic components are used in commercial hydrocracking reaction zones in a reduced and sulfided form. In the past, hydrocracking catalysts have generally been reduced and sulfided before the charge stock was introduced, to stabilize the hydrocracking catalyst. It was believed that this was necessary to prevent the rapid development of extreme high temperature conditions in the reaction zone which would permanently damage the catalyst.

In the preparation of hydrocracking catalysts in the past, reduction and sulfiding of the hydrocracking catalyst was generally done under controlled conditions away from the process facilities which, in most cases, permitted the sulfiding of the hydrocracking catalyst to be accomplished in an exclusively dry atmosphere. It is more desirable to reduce and sulfide the catalyst in place, in the reactor for a number of reasons. Experience has shown that it is difficult to deposit sufficient quantities of sulfur on the catalyst in catalyst manufacturing facilities because the sulfur is released from the catalyst during shipment. This release of sulfur during shipment is extremely dangerous to personnel. Consequently only relatively low sulfur concentrations can safely be composited outside the process facilities. However, in commercial hydrocracking process facilities, the reaction vessel and the various feed and effluent lines contain a relatively large amount of water from previous preparatory operations. This water, hereinafter referred to as "native" water, interfered with the pior art methods of catalyst activation. In order to prevent degradation of the hydrocracking catalyst by native water and water present from reduction of metallic components in the hydrocracking catalyst, the prior art schemes often required that the water in the hydrocracking reactor be removed by complicated and time-consuming drying operations. In some cases, high temperature inert gas purge streams were passed through the catalyst bed to remove all native water present in the catalyst and the reaction zone itself. Reduction was then accomplished by recycling a hot hydrogen stream through the system while removing the water of reduction with driers. An alternative method provided for drying the reaction zone with hot, dry hydrogen or an inert gas purge prior to sulfiding the catalyst.

It has now been found that by using the method of the present invention, native water and water of reduction present during the sulfiding step do not adversely affect the hydrocracking catalyst. Thus, when the present inventive process is used, there is no need to dry recycle gas streams or to extensively dry the system in which the hydrocracking catalyst is contained prior to and during reduction and sulfiding operations.

SUMMARY OF INVENTION

It is an object of the present invention to activate an oxidized hydrocracking catalyst by reducing and sulfiding steps which preclude the necessity of removing water from the system. It is another object of the process of this invention to contact a hydrocracking catalyst with a liquid hydrocabon stream while reduction and sulfiding operations are taking place to prevent the detrimental effects of the presence of water on the hydrocracking catalyst activity and selectivity during normal hydrocracking operations. A further object of the present invention is to provide a more economical and efficient hydrocracking reaction start-up process integrated with a more stable hydrocracking operation.

Accordingly, the present invention provides a method for activating a mass of hydrocracking catalyst containing at least one metallic component in an oxidized form, which comprises:

(a) Contacting the catalyst mass in a reaction zone with hydrogen at a temperature within the range of from about 0° F. to about 350° F., and at a pressure greater than 100 p.s.i.g., (b) During said contacting, introducing into said reaction zone a hydrocarbon feed stock and a sulfur compound selected from the group consisting of hydrogen sulfide, alkyl mercaptans and alkyl sulfides, said hydrocarbon feed stock being maintained in substantially the liquid phase, (c) Raising the temperature of said catalyst mass to a temperature within the range of from about 350° F. to about 500° F. while maintaining the pressure within said reaction zone within the range of from about 500 p.s.i.g. to about 3000 p.s.i.g., (d) Maintaining said catalyst mass at said temperature and pressure for a sufficient time to effect reduction and sulfiding of a major portion of said metallic component, while continuing to maintain a substantial portion of said hydrocarbon feed stock in the liquid phase, and (e) Increasing the temperature of said catalyst mass to a temperature less than about 850° F., to effect hydrocracking reactions.

In a preferred embodiment, the present invention provides for continued sulfur addition to the reaction zone after the reduction and sulfiding is complete, and during the steady-state operation of the hydrocracking reaction.

Other objects and embodiments of the present invention are disclosed in the following detailed description.

The term "in the oxidized state" is intended to refer to the oxidation state of the metallic component or components of the catalyst. These components are generally responsible for the hydrogenating-dehydrogenating activity of the catalyst. The hydrogenating-dehydrogenating components may be selected from the metals of Groups VI–B and VIII of the Periodic Table of the Elements, and include chromium, molybdenum, tungsten, iron, cobalt, nickel, ruthenium, rhodium, palladium, osmium, iridium, platinum and compounds thereof.

In order to initiate the hydrocracking reaction without adversely harming the hydrocracking catalyst activity and selectivity, it is preferred to begin hydrocracking operations with substantially all of the hydrogenating-dehydrogenating components of the catalyst in a sulfided state. Sulfiding reduces the initial high activity associated with most hydrocracking catalysts containing Group VI–B or VIII metals, thereby minimizing the amount of excess gaseous material produced before equilibrium is attained.

The cracking activity of the hydrocracking catalyst is generally furnished by the base or carrier materials which carry the hydrogenating-dehydrogenating components composited therewith. Acidic carriers, which may be used include the silica-aluminas and the crystalline aluminosilicates. Suitable methods for preparing amorphous hydrocracking catalyst are disclosed in the art. They include such methods as the co-gelling of silica and alumina followed by the compositing of the active metallic component of the catalyst, generally in amount from about 0.01% to about 20% by weight of the catalyst.

The metal components may be incorporated into the catalyst base in any suitable manner. One such manner is to composite the metal component with the cracking component by forming an aqueous solution of the halide of the metals such as platinum chloride or palladium chloride, and adding the resultant diluted solution to the cracking component in a steam drier.

Both the natural and synthetic zeolitic alumino-silicate catalysts may be activated by the method of the present invention. The structure and methods of preparation of these zeolites are well known in the art.

Crystalline aluminosilicates, which find use in the process of this invention possess relatively well-defined pore structures. The exact type aluminosilicate is generally defined by the silica/alumina ratio and the pore dimensions. Preferred crystalline aluminosilicates for hydrocracking are the faujasites. The faujasites are commonly represented as type X and type Y aluminosilicates and are defined by their varying silica to alumina ratios.

The synthesized zeolite type X may be represented in terms of mole oxides as represented in the following equation:

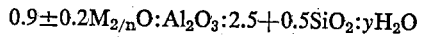

where M represents at least one cation having the valence of not more than 3, $n$ represents the valence of M and $y$ has a value up to about 8 depending on the identity of M and the degree of hydration of the crystal. Zeolite type X is described in U.S. Pat. 2,882,244.

The type Y zeolite may be represented in the terms of the mole ratio of oxides for the sodium form as represented in the following equation:

wherein $w$ is a value greater than 3 and up to about 6 and $y$ may have a value up to about 9. The type Y zeolite is described in U.S. Pat. 3,130,007.

The metallic components may be composited with the crystalline aluminosilicate base in amounts from about 0.1% to about 20% by weight of the catalyst. The metal component may be composited in manners similar to those described for the amorphous aluminosilicate type catalyst. When the metallic components are composited with the crystalline aluminosilicate base or carrier, impregnation or base exchange means are generally utilized.

The method of the present invention may be performed in both single stage hydrocracking reaction zones and in dual reactor hydrorefining-hydrocracking processes. In single stage hydrocracking process schemes, in which an amorphous hydrocracking catalyst is employed, the hydrocracking catalyst activation is preferably effected with a hydrocarbon feed stock containing less than about 500 wt. p.p.m. nitrogen. Excessive amounts of nitrogen appear to have some detrimental effects on the amorphous catalyst stability. In contradistinction, the crystalline catalysts appear to be much less effected by nitrogen compounds at the temperatures here employed.

In single stage hydrocracking reactor processes, the method of the present invention provides for first passing a suitable inert gas through the hydrocracking reaction zone to remove any oxygen, other undesirable gases, or large amounts of entrained water. A stream of gaseous hydrogen at a temperature within the range of from about −18° C. to about 177° C. (about 0° F. to about 350° F.) and at an elevated pressure generally greater than about 6.8 atmospheres, gauge atmg. (or 100 p.s.i.g.), a range of from about 6.8 to about 272 atmg. (about 100 to about 4000 p.s.i.g.) being preferred. At temperatures below about 204° C. (400° F.) there appears to be little reduction of metallic components present on the hydrocracking catalyst and, therefore, little water of reduction is produced. The hydrogen, now in intimate contact with the mass of hydrocracking catalyst, may be continuously circulated into and out of the hydrocracking catalyst reaction zone by a recycle system including recycle gas compressors. It is preferred to continuously circulate gaseous hydrogen through the system prior to introducing the liquid hydrocarbon feed stock. After suitable circulating conditions have been achieved, the liquid hydrocarbon feed stock is then introduced into the mass of catalyst. The pressure within the hydrocracking reaction zone is maintained so that substantially all of the hydrocarbon feed stock during the reduction and sulfiding operations is in liquid phase. The mass of hydrocracking catalyst during this step is also intimately contacted with a sulfur compound preferably selected from the group consisting of hydrogen sulfide, alkyl mercaptans and alkyl sulfides. The sulfur compound may be present in the liquid hydrocarbon feed stock, or the circulating gaseous hydrogen stream or both streams. When the sulfur compound is present in the circulating gaseous hydrogen stream, it is generally present as hydrogen sulfide, as this material is generally gaseous in form. Various combinations of sulfur compounds may be used in the liquid feed stream and/or the circulating gaseous stream.

It is preferred that the temperature of the catalyst mass be increased to the specified range of 177° C. to 260° C. (350° F. to 500° F.) at a rate which will not damage the catalyst. Generally, the temperature may be increased at a rate of less than 56° C. per hour (100° F. per hour) with little or no danger of damaging the catalyst. Preferably the temperature may be increased at a rate within the range of from about 5.6° C. per hour to about 56° C. per hour (about 10° F./hr. to about 100° F./hr.).

It is preferred that the quantity of sulfur compounds used be sufficient to allow sulfiding of metallic components present in the hydrocracking catalyst in a reasonable length of time. From the metal content of the catalyst, and the quantity of the sulfur compound passing into the reaction zone, it is possible to calculate the time required for sulfiding, assuming essentially complete conversion of the metal to sulfides. The length of time required to sulfide a given mass of catalyst, when the sulfur compound is introduced in admixture with the liquid feed stock, will depend upon the liquid charge rate and the concentration of sulfur in the feed stock. To effect sulfiding within a reasonable period of time, the hydrocarbon feed stock may be introduced at a liquid hourly space velocity within the range of from about 0.1 to about 20, with a sulfur concentration based on the charge stock within the range of from about 50 wt. part per million (p.p.m.) to about 10 wt. percent. Preferably, the charge stock is introduced at a liquid hourly space velocity within the range of from about 0.2 to about 5, with a preferred sulfur concentration within the range of from about 200 wt. p.p.m. to about 2 wt. percent.

In some instances, naturally-occurring sulfur may be present in the charge stock to be hydrocracked. For example, the present activation method may be employed preparatory to the hydrocracking of various black oils such as petroleum crude oils, heavy residual oils extracted from tar sands, topped or reduced crudes, and vacuum residuals. These black oils contain high molecular weight sulfurous compounds, and may generally be characterized as a heavy carbonaceous material of which more than about 10.0% by volume boils above a temperature of 566° C. (1050° F.). Such material generally has a specific gravity of greater than about .9340 at 15.6° C. (less than 20.0° API), and sulfur concentrations greater than about 2.0% by weight. When such black oils are used in conjunction with the present invention, the reduction and sulfiding may be accomplished without the introduction of additional sulfur compounds. Where the concentration of native sulfur compounds present in the liquid hydrocarbon charge is not high enough to effect sulfiding within an economically feasible time, additional amounts of sulfur compound may be injected into the liquid feed stock and/or the gaseous stream to act in conjunction with the naturally-occurring sulfur in the feed stock.

In those instances where a black oil is to be hydrocracked, it is generally preferred to employ a relatively "clean" activation oil during the sulfiding and reduction of the catalyst to avoid depositing asphaltic materials and contaminating metals on the catalyst mass. Examples of such activation oils include cycle oils and straight run distillates.

In a preferred embodiment, the introduction of sulfur compound into the reaction zone may be continued after the reduction and sulfiding is complete, and steady-state hydrocracking conditions have been attained. It is believed that such continuous sulfur addition has the beneficial effect of maintaining the catalyst in a fully sulfided state throughout the hydrocracking operation by minimizing the amount of sulfur that may be swept off the catalyst. After sulfiding, and in accordance with this preferred embodiment, it is preferable to reduce the amount of sulfur entering the reaction zone to a concentration within the range of from about 1 to about 100 wt. p.p.m. based on the liquid charge, and more preferably to a concentration within the range of from about 15 to about 50 p.p.m. Of course, where the feed stock to be hydrocracked is a black oil containing substantial amounts of native sulfur, no additional sulfur need be added to achieve continuous sulfur addition.

After the reduction and sulfiding operations have taken place, the hydrocracking catalyst reaction zone is then increased in temperature to a temperature below about 454° C. (about 850° F.) to effect hydrocracking of the feed stock passing through the mass of hydrocracking catalyst. The hydrocracking is preferably effected at a temperature within the range of from about 288° C. to about 454° C. (550° F. to about 850° F.). Again, it is preferred that this temperature increase be at a rate which will not damage the catalyst. Generally, a rate of less than 56° C. per hour (100° F./hr.) is satisfactory; a rate within the range of from about 5.6° C./hr. to about 56° C./hr. (about 10° F./hr. to about 100° F./hr.) being preferred.

The method of activation of a hydrocracking catalyst as disclosed herein may also be used in series flow hydrorefining-hydrocracking processes and two stage flow hydrorefining-hydrocracking processes with a separation step after the hydrorefining reaction zone and before the hydrocracking reaction zone. The separation zone is used to remove gaseous components (principally nitrogen and sulfur compounds) which have been converted to primarily hydrogen sulfide and ammonia in the hydrorefining zone, and which are substantially removed from the hydrorefined hydrocarbon stock withdrawn from the hydrorefining zone.

In the dual reaction zone hydrorefining-hydrocracking operations, the hydrorefining zone may be placed in operation, and the hydrorefined liquid effluent may then be used as the liquid hydrocarbon feed stock to the hydrocracking zone for activating the hydrocracking catalyst. This simplifies the start-up procedure for the entire two stage process.

In two stage operations in which a separation zone is used to separate some of the gaseous products from the hydrorefined effluent, the hydrorefined liquid hydrocarbon material passing into the hydrocracking zone may not provide a sufficient quantity of sulfur to sulfide the catalyst in a reasonable period of time. Further, sufficient quantity of sulfur may not be present to provide the amounts required for the continuous sulfur addition procedure of the preferred embodiment described hereinabove. In this event, a sulfur compound may be introduced into the hydrocracking reaction zone by injecting the additive sulfur compound into the gaseous hydrogen stream, the liquid hydrocarbon stream, or both.

Hydrocracking feed stocks which may be employed herein in addition to those described hereinabove include general mineral oil fractions boiling above about 149° C. (300° F.) and usually above about 204° C. (400° F.) and having an end boiling point of up to about 538° C. (1000° F.). Such mineral oil fractions include straight-run gas oils, coker distillate gas oils, deasphalted crude oils and cycle oils derived from catalytic or thermal cracking. Such fractions may be derived from petroleum crude oils, shale oils, tar sand oils, coal hydrogenation products and similar oils. Preferred feed stocks are the black oil feed stocks, and feed stocks boiling in the range of from about 204° C. to about 566° C. (about 400° F. to about 1050° F.), having a specific gravity in the range of from about .8251 to about .9659 at 15.6° C. (an API gravity of about 15° to about 40°), and containing at least about 20% by volume of acid soluble components (aromatics plus olefins). Such oils may originally contain about 0.01% to about 5% by weight of sulfur and about 0.01% to about 2% by weight of nitrogen and, prior to being hydrocracked, are preferably subjected to a hydrorefining operation designed to decompose nearly all of the organic sulfur, nitrogen and oxygen compounds therein.

The gaseous hydrogen stream used in reduction and sulfiding of the hydrocracking catalyst is preferably relatively pure hydrogen gas. A gaseous hydrogen purity of at least about 80 mol percent of hydrogen is most preferred. Thus, when hydrogen sulfide gas is used, the total hydrogen purity including hydrogen and hydrogen sulfide is preferably above 80 mol percent. In some instances, it is possible to use refinery gas streams containing large amounts of hydrogen which generally may be taken from hydrogen producing units within the refinery, such as reformers and other basic dehydrogenation type processes. Small amounts of light hydrocarbons ($C_4$ and lighter gases) present in the gaseous stream passing into the hydrocracking reaction zone during reduction and sulfiding operations do not appear to detrimentally affect resulting catalyst activity and selectivity.

During the initial contacting of the catalyst with the gaseous hydrogen stream at superatmospheric pressure, the temperature is maintained within the range of from about −18° C. to about 177° C. (0° F. to about 350° F.). The upper temperature limit is set so that reduction of the metal present in the hydrocracking catalyst is minimized during this period to avoid the formation of water before any liquid hydrocarbon is present to protect the catalyst. While the mechanism by which the liquid hydrocarbon protects the catalyst from the deleterious effects of water is not clearly understood, it is believed that the liquid hydrocarbon stream is partially absorbed by the hydrocracking catalyst. This appears to prevent subsequent adsorption of water by the catalyst.

After introduction of the liquid hydrocarbon feed stock, the temperature of the resulting mixture is then increased to a temperature in the range of from about 177° C. to about 260° C. (350° F. to about 500° F.) while maintaining the mixture of catalyst, gaseous hydrogen, liquid hydrocarbon and sulfur compound at a pressure of from about 34 to about 204 atmg. (500 p.s.i.g. to about 3000 p.s.i.g.) to keep primarily liquid material in contact with the catalyst. Reduction and sulfiding operations take place under these conditions, and the water produced during the reduction of the metal is not absorbed by the catalyst because of the previous contact of the catalyst mass with the liquid hydrocarbon stream and passes through the hydrocracking reaction zone without detrimental effects to the catalyst.

Complete reduction and sulfiding of the metallic component or components of the hydrocracking catalyst is generally determined by the presence of hydrogen sulfide in the effluent gas leaving the hydrocracking reaction zone. The presence of unreacted sulfur compounds, such as hydrogen sulfide, alkyl mercaptans and alkyl sulfides is an indication that substantially all of the metallic components present in the hydrocracking catalyst in the hydrocracking reaction zone which are capable of being sulfided, have been sulfided. After this sulfur breakthrough is recognized, the temperature of the hydrocracking reaction zone is then increased to a temperature of less than about 454° C. (850° F.) to effect hydrocracking of the hydrocarbon material passing into the hydrocracking reaction zone. During this step, it may be necessary under certain conditions to change the hydrocarbon material passing into the hydrocracking reaction zone.

The two quantities that readily give a basis for comparative catalyst evaluation when using the method of activation of this invention, are the average catalyst bed temperature and the yield of gases which are lighter than pentane. The average bed temperature is an indication of the activity of the catalyst, since this temperature is adjusted responsive to the conversion realized, so as to maintain a level of conversion as close to 100 liquid volume percent of fresh feed into gasoline and lighter components as possible. The butane-and-lighter gas yield is a measure of selectivity in terms of undesirable light-ends. Thus, a comparatively low catalyst bed temperature and low gas yield would be found for a catalyst of high activity and favorable selectivity. The invention and the benefits afforded therefrom are illustrated in the following examples which are not intended as limiting on the broad scope of the present invention.

EXAMPLE I

Example I was used as a base case, illustrating a prior art method of activation to permit comparison with the benefits afforded by the use of the activation method of the present invention. The catalyst used in this example was a high purity type Y faujasite, which contained approximately 5.3 wt. percent nickel, calculated as existing in the elemental state, in the finished catalyst. The finished catalyst had a loss on ignition (LOI) at approximately 900° C. of about 20 wt. percent. The catalyst used in this example, prior to impregnation with nickel, was decationized. That is, the faujasite was ion-exchanged with an ammonium salt solution and thereafter calcined at a temperature high enough to drive off ammonia, leaving a hydrogen form of the faujasite which was subsequently impregnated with a solution of nickel nitrate and then washed and dried to give a finished catalyst. The finished catalyst was then reduced and sulfided under laboratory conditions by passing hydrogen and $H_2S$ over the catalyst in the absence of liquid hydrocarbons. The sulfiding reactions took place in an essentially dry system. The catalyst used in this example is commonly referred to as commercial grade, pre-reduced and sulfided hydrocracking catalyst.

This catalyst was loaded into a catalyst testing plant and run at conditions shown below in order to generate data which could be used in comparing the selectivity and activity of this catalyst with a similar catalyst which was reduced and sulfided according to the methods of the present invention.

The catalyst testing unit which was used to evaluate the performance of the catalyst used in this example and in subsequent examples, was essentially a single reaction zone type plant with general flow scheme as described below. Fresh feed together with a recycle stream in a combined feed ratio of about 1.5 to 1, which was made up of hydrocracking reaction zone effluent which boiled within the range of from about 204° C. to about 349° C. (about 400° F. to about 660° F.) was passed in admixture with a hydrogen rich gaseous stream into the hydrocracking reaction zone at a liquid hourly space velocity of 1. The reactor contained about 400 cc. of the above mentioned hydrocracking catalyst. The effluent from the hydrocracking reactor was then passed to a high pressure separator wherein liquid and gaseous streams were separated. The gaseous stream comprised primarily hydrogen (in excess of 95% hydrogen for all the examples presented here), and was recycled along with fresh hydrogen at a rate of about 1780 standard cubic meters per kiloliter (10,000 standard cubic feet per barrel). The liquid effluent from the high pressure separator was then passed into a stripper column. The stripper column separated, primarily, gases having molecular weights of four carbon numbers or less from the liquid effluent passing out of the high pressure separator. The bottoms stream from the stripper column which comprised $C_5+$ hydrocarbon material was then passed into a recycle column. The recycle column separated the liquid effluent from the stripper to provide a gas phase containing any $C_4$ and lighter hydrocarbons which were not removed in the stripper column, a gasoline fraction boiling in the range from about 38° C. to about 216° C. (100° F. to about 420° F.), and a bottoms fraction boiling above about 216° C. (about 420° F.). The recycle column bottoms fraction was recycled back in admixture with the fresh feed to the reaction zone to be further hydrocracked to gasoline and lighter components. In this example and in all subsequent examples, the catalysts which were evaluated were tested at 100 liquid volume percent conversion of fresh feed. A conversion of 100 liquid volume percent is defined as essentially complete conversion of the fresh feed passing into the hydrocracking reaction zone into gasoline and lighter hydrocarbons. As a result, a constant quantity of recycle column bottoms fraction is recycled to the hydrocracking reaction zone.

In this example and in all subsequent examples, the hydrocracking reaction conditions included a pressure in the reaction zone of about 102 atmg. (1500 p.s.i.g.), a liquid hourly space velocity into the hydrocracking reaction zone of about 1.0, based on fresh feed rate, a combined feed ratio of about 2 (combined feed ratio equals the fresh feed rate plus the recycled column bottom rate all divided by the fresh feed rate), a hydrogen circulation rate in the reaction zone of about 1780 standard cubic meters per kiloliter (10,000 standard cubic feet per barrel) based on fresh feed rate and a catalyst temperature required to convert about 100 liquid volume percent of the fresh feed to gasoline or the lighter weight components. The feed stock used for Examples I, II and III was a hydroefined Northwestern light cycle oil. To simulate conditions which may exist in commercial hydrocracking operations, sulfur, nitrogen and water were added to the charge stock in the form of t-butyl mercaptan, t-butyl amine, and t-butyl alcohol, respectively. The feed stock had the properties set forth in Table I below.

TABLE I

| | |
|---|---|
| Gravity, ° API at 60° F. | 29.1 |
| Specific gravity, at 15.6° C. | 0.8811 |
| Initial boiling point, ° F. | 210 |
| 5% vol. ° F. | 450 |
| 10%, ° F. | 464 |
| 30%, ° F. | 478 |
| 50%, ° F. | 494 |
| 70%, ° F. | 518 |
| 90%, ° F. | 576 |
| 95%, ° F. | 598 |
| End boiling point | 660 |
| Total sulfur, wt. p.p.m. | 2000 |
| Organic nitrogen, wt. p.p.m. | 85 |
| Water, wt. p.p.m. | 2000 |
| Aromatic LV% | 53.9 |
| Olefins | 0 |
| Saturates | 46.1 |
| Carbon/hydrogen wt. percent | 86.99/11.67 |

The prior art standard start-up procedure was used, and steady-state operation was achieved. Data for an 18-hour test period was collected, the results of which are tabulated below in Table II.

TABLE II

| | |
|---|---|
| Catalyst life,[1] BPP | 0.40 |
| Average catalyst bed temperature, ° F. | 706 |
| Yields,[2] wt. percent: | |
| $C_1$ | 0.05 |
| $C_2$ | 0.24 |
| $C_3$ | 5.42 |
| $C_4$ | 14.11 |
| Total $C_4$ and lighter | 19.82 |
| Total $C_5$ | 11.59 |
| Total $C_6$ | 12.21 |
| Total $C_7$ and heavier | 59.53 |
| Total chemical hydrogen consumption,[3] s.c.f.b. | 1933 |

[1] Based on barrels of fresh feed processed for each pound of catalyst (BPP). Corresponds to 0.140 kiloliters per kilogram.
[2] Includes hydrogen consumed in hydrocracking reactions, based on wt. percent of fresh feed processed.
[3] In standard cubic feet of hydrogen per barrel of fresh feed processed. Corresponds to 344 standard cubic meters per kiloliter.

EXAMPLE II

The catalyst used in this example was identical to the catalyst used in Example I, except that the catalyst used in this example was not pre-reduced and sulfided in the laboratory. Instead, the catalyst was loaded into the hydrocracking reaction zone in an oxidized state. After loading 400 cc. of this catalyst into the hydrocracking reaction zone under a suitable gas purge, the catalyst was then reduced and sulfided in place using a gaseous reduction and sulfiding scheme of the prior art, with intermittent high temperature gas purges to remove entrained water and water from reduction reactions in the hydrocracking reaction zone.

To perform the reduction and sulfiding, the hydrocracking reaction zone was purged using nitrogen at about 6.8 atmg. (100 p.s.i.g.) with a 2% oxygen-98% nitrogen gaseous mixture. The oxygen-nitrogen mixture was circulated while the reactor temperature was increased at about 56° C. per hour (100° F./hr.) to a temperature of about 427° C. (800° F.). The plant was held at this temperature, and at 20.4 atmg. (300 p.s.i.g.) for approximately two hours while the oxygen-nitrogen mixture was circulated in order to dry out the system. The reactor was then cooled and held at approximately 149° C. (300° F.). Nitrogen was then passed through the plant until the effluent gas from the hydrocracking reactor had a water concentration which was below its saturation concentration at room temperature. The plant was then purged with a pure nitrogen stream at about 13.6 atmg. (200 p.s.i.g.). After substantially all of the oxygen had been removed from the reaction zone and other lines in the plant, a gaseous mixture of 25% hydrogen and 75% nitrogen was introduced into the reaction zone. The effluent gas stream from the reaction zone was monitored for water content. The reaction zone temperature was raised at about 56° C./hr. (100° F./hr.) to a temperature of about 413° C. (775° F.), which temperature was held for about two hours. After the two hour period, the nitrogen flow rate was gradually reduced until essentially pure hydrogen was passing over the catalyst. The pressure in the reaction zone was then slowly increased to 102 atmg. (1500 p.s.i.g.) while maintaining the water content of the effluent gas from the hydrocracking reaction zone close to its saturation water concentration when measured at room temperature and plant pressure. The water content of the gas passing through the hydrocracking reaction zone was maintained at its water saturation concentration by addition of small amounts of fresh dry hydrogen to the plant. The reactor was then cooled to about 371° C. (700° F.), and the catalyst was sulfided using a 1% hydrogen sulfide-99% hydrogen gas mixture. After a noticeable breakthrough of hydrogen sulfide in the effluent gas stream, the reactor was cooled to ambient temperatures and the plant was started up using the feed stock described in Table I.

The charge stock was cut into the hydrocracking reaction zone at ambient temperatures, and at a pressure of about 102 atmg. (1500 p.s.i.g.), a liquid hourly space velocity based on fresh feed of approximately 1, and a hydrogen circulation rate through the hydrocarcking reactor of about 1780 standard cubic meters per kiloliter (10,000 standard cubic feet per barrel) based on the fresh feed flowing into the hydrocracking reaction zone. The hydrocracking reaction zone temperature was increased at a rate of about 11° C. per hour (20° F./hr.) to about a temperature of 302° C. (575° F.). A recycle stream as in Example I was established. The combined feed ratio was then maintained at about 2.0. The reactor temperature was then adjusted so as to establish approximately 100 liquid volume percent conversion of the fresh feed to gasoline and lighter weight components (material boiling below about 420° F.). After steady-state operations were achieved, and 100 liquid volume percent conversion was occurring, an 18-hour test was made on the plant. Results of this test are shown below in Table III.

TABLE III

| | |
|---|---|
| Catalyst life,[1] BPP | 0.41 |
| Average catalyst bed temperature, ° F. | 750 |
| Yields,[2] wt. percent: | |
| $C_1$ | 0.15 |
| $C_2$ | 0.45 |
| $C_3$ | 7.73 |
| $C_4$ | 16.59 |
| Total $C_4$ and lighter | 24.92 |
| Total $C_5$ | 11.55 |
| Total $C_6$ | 11.18 |
| Total $C_7$ and heavier | 55.82 |
| Total chemical hydrogen consumption,[3] s.c.f.b. | 2120 |

[1] Based on barrels of fresh feed processed for each pound of catalyst (BPP). Corresponds to 0.144 kiloliters per kilogram.
[2] Includes hydrogen consumed in hydrocracking reactions.
[3] In standard cubic feet of hydrogen per barrel of fresh feed processed. Corresponds to 377 standard cubic meters per kiloliter.

EXAMPLE III

The catalyst used in this example was the same as that used in Example II. 400 cc. of the catalyst was loaded into the hydrocracking reactor in an oxidized state and was reduced and sulfided using the method of activation of the present invention, as described below.

A preliminary low pressure nitrogen gas purge was passed through the entire system to remove any oxygen and any large amounts of native water. The nitrogen gas in the hydrocracking reactor and connecting lines was then purged with hydrogen and the plant pressure raised to about 102 atmg. (1500 p.s.i.g.), while maintaining the reactor temperature at ambient temperatures. The feed stock as described in Table I above was then passed into the hydrocracking reaction zone at a liquid hourly space velocity based on fresh feed of approximately 1, with hydrogen circulating through the hydrocracking reaction zone at 1780 standard cubic meters per kiloliter (10,000 s.c.f.b.) based on the fresh feed charge rate.

The hydrocracking catalyst reaction zone temperature was then increased at a rate of about 11° C. per hour (20° F./hr.) to a temperature of about 204° C. (400° F.) then held at that temperature for about 8 hours. After holding the system at 204° C. (400° F.) for an 8-hour period, samples of the hydrocracking reactor effluent gas were taken to determine if there was a breakthrough of hydrogen sulfide. Two consecutive samples of the hydrocracking reaction zone gaseous effluent indicated that the gas contained an excess of 20 grains of hydrogen sulfide per 100 standard cubic feet of the effluent gas (46.4 grams per 100 standard cubic meters). This indicated that most of the metals in the hydrocracking catalyst had been reduced and sulfided. The hydrocracking catalyst temperatures were then increased at a rate of about 27.8° C. per hour (about 50° F./hr.) until the conversion temperature of about 343° C. (650° F.) was approached. As the temperature came closer to this level, the rate of increase was gradually reduced, until 343° C. was reached. After a suitable amount of recycle bottoms material accumulated in the recycle column, recycle operations were started and the combined feed ratio was established at approximately 2.0. The temperature of the hydrocracking reaction zone was then constantly adjusted to maintain 100 liquid volume percent conversion of the fresh feed while maintaining a constant rate of production of the recycle column bottoms material.

After steady-state operation had been achieved, an 18-hour test was run. The results of this test are shown in Table IV.

TABLE IV

| | |
|---|---|
| Catalyst Life [1], BPP | 0.67 |
| Average catalyst bed temperature, ° F. | 679 |
| Yields [2], wt. percent | |
| $C_1$ | 0.04 |
| $C_2$ | 0.30 |
| $C_3$ | 4.09 |
| $C_4$ | 11.24 |
| Total $C_4$ and lighter | 15.67 |
| Total $C_5$ | 10.28 |
| Total $C_6$ | 11.20 |
| Total $C_7$ and heavier | 65.90 |
| Total chemical hydrogen consumption [3], s.c.f.b. | 1881 |

[1] Based on barrels of fresh feed processed for each pound of catalyst (BPP). Corresponds to .231 kiloliters per kilogram.
[2] Includes hydrogen consumed in hydrocracking reactions.
[3] In standard cubic feet of hydrogen per barrel of fresh feed processed. Corresponds to 335 standard cubic meters per kiloliter.

Table V presents a comparison of catalyst performance for the three above examples.

TABLE V

| Brief description of catalyst and method of activation used | $C_4$ and lighter yield, wt. percent | Average catalyst bed temp. required for 100 LV percent conv., ° F. |
|---|---|---|
| Example I: Pre-reduced and sulfided | 19.82 | 706 |
| Example II: Oxidized catalyst reduced and sulfided in presence of water saturated $H_2S$ plus $H_2$ gas streams | 24.92 | 750 |
| Example III: Oxidized catalyst reduced and sulfided according to methods of this invention | 15.67 | 679 |

The tabulation above clearly demonstrates the advantages attainable through use of the present inventive activation method. The 3.9% and 10.3% improvement in average bed temperature indicates that a much more stable operation is possible after the hydrocracking catalyst has been activated in accordance with the present invention. Further, the 26.5% and 59.1% decrease in light gas yield indicates that a significant improvement in selectivity results from the use of the present inventive method.

EXAMPLE IV

In this example, two additional test runs A and B were made in the same equipment in order to compare the stability attainable by the use of the present inventive activation method with and without the continuous sulfur addition feature of the hereinabove described preferred embodiment.

The hydrocracking reactor was loaded with 400 cc. of the catalyst described in Examples II and III. The activation method of Example III was repeated, using a light cycle oil identical to that described in Example I except that it contained about 300 p.p.m. of sulfur, added to the charge stock in the form of dimethyl sulfide. The liquid hourly space velocity of the charge was 1. After significant quantities of $H_2S$ appeared in the gaseous hydrogen stream indicating substantially complete reduction and sulfiding, Test A was begun. The reactor temperature was increased at the rate of about 28° C. (50° F./hr.) from the sulfiding and reduction temperature of 204° C. (400° F.) to the hydrocracking reaction temperature of 343° C. (650° F.). As the hydrocracking reaction temperature was approached, the addition of dimethyl sulfide to the charge stock was discontinued, so that by the time 343° C. was reached, the recycle gas and liquid effluent were substantially free from sulfur compounds. Steady-state operation was established as in Example III, and a stability Test A was made which was arbitrarily terminated after the catalyst had been exposed to 20 barrels of charge per pound of catalyst (7 kiloliters per kilogram). The temperature of the catalyst was continuously adjusted during the test to maintain 100 liquid volume percent conversion.

A fresh charge of 400 cc. of catalyst was then loaded into the reactor, and reduced and sulfided by the method of the present invention as described in this example. In this test however, the addition of dimethyl sulfide to the charge stock was not discontinued, but only reduced to 50 p.p.m. after the sulfiding and reduction was completed. Steady-state operation was established, and a stability Test B was made. Data was again collected until the catalyst had been exposed to 20 barrels of charge per pound of catalyst (7 kiloliters per kilogram). Again the catalyst bed temperature was continuously adjusted to maintain 100 liquid volume percent conversion. The results of tests A and B are tabulated in Table VI below.

TABLE VI

| | Test A | Test B |
|---|---|---|
| Catalyst life, BPP [1] | 20 | 20 |
| Initial catalyst bed temp., °F | 679 | 679 |
| Final catalyst bed temp., °F | 729 | 700 |
| Initial $C_4^-$ gas yield, wt. percent | 15.7 | 15.7 |
| Final $C_4^-$ gas yield, wt. percent | 20.7 | 17.7 |
| Initial $C_5^+$ yield, wt. percent | 87.4 | 87.4 |
| Final $C_5^+$ yield, wt. percent | 82.3 | 85.3 |

[1] Based on barrels of fresh feed processed for each pound of catalyst. Corresponds to 7 kiloliters per kilogram.

From a comparison of the above data, the advantages of continuous sulfur addition in accordance with the preferred embodiment described hereinabove are clear. The 4.2% improvement in final catalyst bed temperature, and the 17% improvement in $C_4^-$ gas yield for Test B indicate that a more stable and selective process results from the employment of the preferred embodiment of the present invention.

EXAMPLE V

In this example, the activation method of the present invention was conducted as in Example III, with the exception that the Northwest cycle oil used as a feed stock contained only 5 p.p.m. sulfur. Hydrogen sulfide was added to the recycle hydrogen employed during the reduction and sulfiding step in an amount which resulted in a sulfur concentration based on the liquid charge of 2000 wt. p.p.m. After sulfiding and reducing as in Example III, a test was run at the steady-state hydrocracking conditions described in Example III. Only minor variations in average catalyst bed temperature and $C_4^-$ gas yield over that of Example III were noticed.

We claim as our invention:

1. A method for activating a mass of hydrocracking catalyst containing at least one metallic component in an oxidized form, which comprises:
   (a) contacting the catalyst mass in a reaction zone with hydrogen at a temperature within the range of from about 0° F. to about 350° F., and at a pressure greater than 100 p.s.i.g.,
   (b) during said contacting, introducing into said reaction zone a hydrocarbon feed stock and a sulfur compound selected from the group consisting of hydrogen sulfide, alkyl mercaptans and alkyl sulfides, said hydrocarbon feed stock being maintained in substantially the liquid phase,
   (c) raising the temperature of said catalyst mass to a temperature within the range of from about 350° F. to about 500° F. while maintaining the pressure within said reaction zone within the range of from about 500 p.s.i.g. to about 3000 p.s.i.g.,
   (d) maintaining said catalyst mass at said temperature and pressure for a sufficient time to effect reduction and sulfiding of a major portion of said metallic component, while continuing to maintain a substantial portion of said hydrocarbon feed stock in the liquid phase, and
   (e) increasing the temperature of said catalyst mass to a temperature less than about 850° F. to effect hydrocracking reactions.

2. The process of claim 1, further characterized in that the introduction of the sulfur compound is continued after the reduction and sulfiding is complete, and during the steady-state hydrocracking of the feed stock.

3. The process of claim 2, further characterized in that the hydrocracking catalyst comprises at least one metallic component selected from the group consisting of chromium, molybdenum, tungsten, iron, cobalt, nickel, ruthenium, rhodium, palladium, osmium, iridium, platinum, and compounds thereof, composited with a crystalline aluminosilicate.

4. The process of claim 3, further characterized in that the crystalline aluminosilicate comprises faujasite.

5. The process of claim 2, further characterized in that the hydrocracking catalyst comprises at least one metallic component selected from the group consisting of chromium, molybdenum, tungsten, iron, cobalt, nickel, ruthenium, rhodium palladium, osmium, iridium, platinum and compounds thereof, composited with an amorphous silica-alumina support.

6. The process of claim 5, further characterized in that the hydrocarbon feed stock contains less than 500 wt. p.p.m. nitrogen.

7. The process of claim 2, further characterized in that the sulfur compound is introduced into the reaction zone in admixture with the liquid hydrocarbon feed stock.

8. The process of claim 2, further characterized in that the sulfur compound is introduced into the reaction zone in admixture with the hydrogen, in the form of hydrogen sulfide.

9. The process of claim 2, further characterized in that the hydrocarbon feed stock is introduced into the reaction zone at a liquid hourly space velocity within the range of from about 0.1 to about 20, and the sulfur compound is introduced at a rate to provide a sulfur concentration within the range of from about 50 wt. p.p.m. to about 10 wt. percent, based on the feed stock.

10. The process of claim 9, further characterized in that the rate of introduction of the sulfur compound is reduced after the sulfiding and reduction is substantially complete to provide a sulfur concentration within the range of from about 1 to about 100 wt. p.p.m. based on the feed stock.

References Cited

UNITED STATES PATENTS

| 3,211,642 | 10/1965 | Unverferth | 208—111 |
| 3,287,257 | 11/1966 | Hansford et al. | 208—111 |
| 3,586,620 | 6/1971 | Conner et al. | 208—111 |

DELBERT E. GANTZ, Primary Examiner

G. E. SCHMITKONS, Assistant Examiner

U.S. Cl. X.R.

252—414, 455 R, 455 Z